United States Patent
Finlow-Bates et al.

(10) Patent No.: US 9,122,371 B2
(45) Date of Patent: Sep. 1, 2015

(54) DISPLAYING AN ICON BASED UPON USER INPUT

(71) Applicant: QUALCOMM Incorporated, San Diego, CA (US)

(72) Inventors: Keir Finlow-Bates, Kangasala (FI); Koushik Annapureddy, Tampere (FI)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/791,735

(22) Filed: Mar. 8, 2013

(65) Prior Publication Data

US 2014/0259154 A1 Sep. 11, 2014

(51) Int. Cl.
 *G06F 21/00* (2013.01)
 *G06F 3/0481* (2013.01)
 *G06F 21/31* (2013.01)

(52) U.S. Cl.
 CPC ............ *G06F 3/04817* (2013.01); *G06F 21/31* (2013.01)

(58) Field of Classification Search
 CPC ............................. G06F 3/04817; G06F 21/31
 See application file for complete search history.

(56) References Cited

U.S. PATENT DOCUMENTS

| | | | |
|---|---|---|---|
| 7,028,192 | B2 | 4/2006 | Butler |
| 7,240,339 | B2 | 7/2007 | Cragun et al. |
| 7,949,936 | B2 | 5/2011 | Friedman et al. |
| 8,024,791 | B2 | 9/2011 | Pakhunov |
| 2006/0090073 | A1 | 4/2006 | Steinberg et al. |
| 2009/0164923 | A1* | 6/2009 | Ovi ................................ 715/764 |
| 2009/0300755 | A1* | 12/2009 | Pakhunov ........................ 726/18 |
| 2011/0167335 | A1 | 7/2011 | Nickas, Jr. et al. |

OTHER PUBLICATIONS

Paul Sawaya, "Firefox Add-Ons: Visual Hashing 0.2", Aug. 4, 2012, Retrieved from the Internet: UR>:https://web.archive.org/web/20120804063815/https://addons.mozilla.org/en-US/fiefox/addon/visual-hashing/.
Vash:, Dec. 11, 2011, Retrieved from the Internet: URL:https://web.archive.org/web/20111211140637/http://thevash.com/docs/README.html.
"Visual Password Feedback for jQuery", Feb. 5, 2013, Retrieved from the Internet: URL:https://web.archive.org/web/20130205182304/http://asgaard.co.uk/misc/jquery/?show=passhash.
"Best VNC viewer and settings to connect to OS X Tiger?", Feb. 13, 2013, Retrieved from the Internet:URL:https://web.archive.org/web20130213180807/http://forums.macrumors.com/archive/index.php/t-134180.html.
"The Pros and Cons of Password Masking", Schneier on Security, Jul. 6, 2009, Rerieved from the Internet: URL:https://web.archive.org/web/20090706034625/http://www.schneier.com/blog/archives/2009/07/the_pros_and_co.html.
International Search Report from corresponding PCT/US2014/020897 dated May 19, 2014.

* cited by examiner

*Primary Examiner* — Izunna Okeke
(74) *Attorney, Agent, or Firm* — Blakely Sokoloff Taylor & Zafman

(57) ABSTRACT

Disclosed is an apparatus, system, and method for a computing device to display an icon based upon user input. The computing device may receive user input and generate an icon based upon a checksum function of the user input. The computing device may display the icon to a user on a display device.

30 Claims, 4 Drawing Sheets

DISPLAYING AN ICON BASED UPON USER INPUT

BACKGROUND

1. Field

The present invention relates to an apparatus, method, and system to display an icon based upon user input.

2. Relevant Background

Many computing device functions, such as: logging onto a computing device; logging onto a website; unlocking a mobile phone; purchase transactions; banking transactions; credit-card transactions, etc.—typically require that a user enter a password. For example, log-in passwords are typically utilized to prevent brute-force log-in attempts. Further, passwords for banking transactions and credit card transactions are utilized to prevent monetary theft.

However, in today's typical implementations, when a user enters a private password to unlock their computing device, to log-in to a particular website, or to access an automatic teller machine (ATM), the user does not see the password they are entering, such that it is easy to mistype the password, and to use up the number of authorized log-in attempts.

Unfortunately, if a user has a used up their number of authorized log-in attempts, and their credit card or debit card is locked after too many attempts, this can be disastrous for the user, as they may have no access to money or to complete a transaction. For example, if a user is on vacation, and has no access to cash, and their debit card has been disabled for the day at an ATM, the user may not be able to gain access to food, lodging, gas, etc.

SUMMARY

Aspects of the invention may relate to an apparatus, system, and method for a computing device to display an icon based upon user input. The computing device may receive user input and generate an icon based upon a checksum function of the user input. The computing device may display the icon to a user on a display device.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Embodiments of the invention provide a methodology to assist users in the correct entry of passwords that are hidden from the user for security reasons and/or that are often very long (and even if shown to a user) are prone to entry error.

Figure 1:
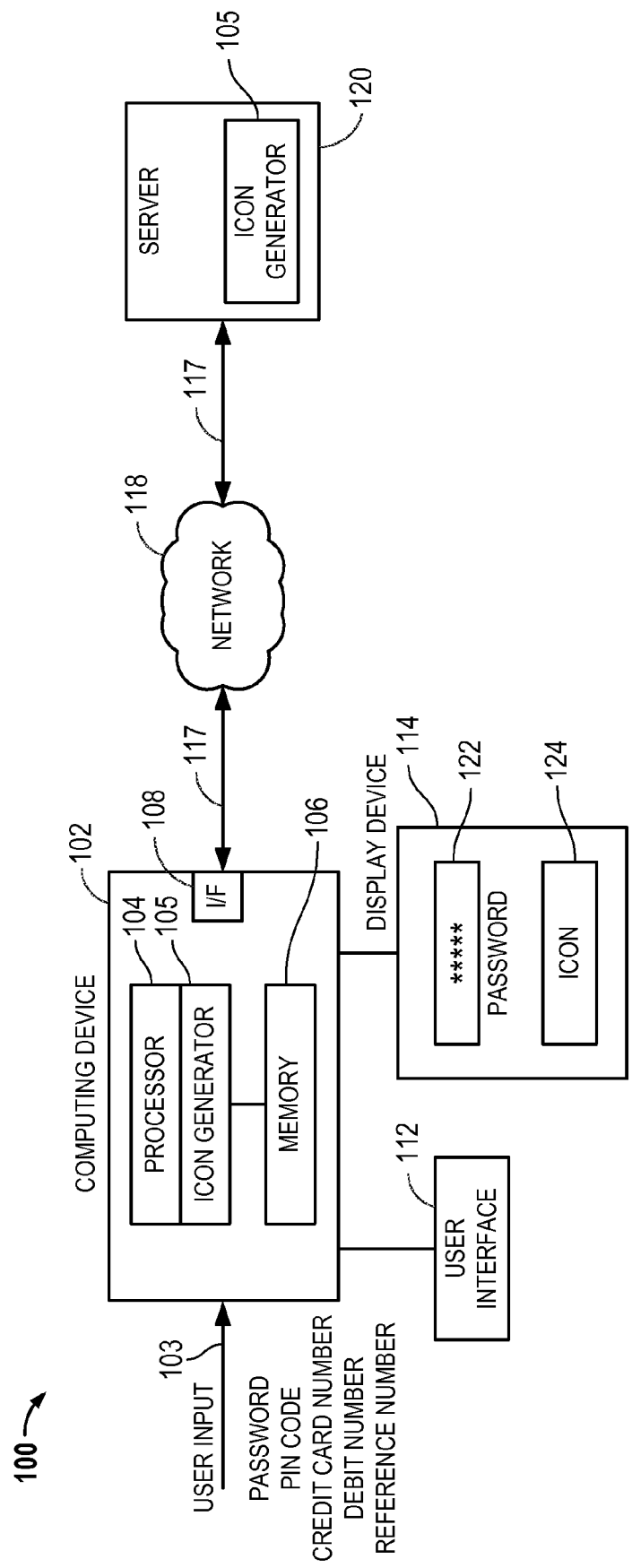
FIG. 1 is a diagram of a system in which aspects of the invention related to a computing device that displays an icon based upon user input may be practiced.

In order to achieve this, an apparatus, system, and method for displaying an icon based upon user input will be hereinafter described. With reference to FIG. 1, in one embodiment, a computing device 102 may receive user input 103. This user input may be a password 122 that is hidden on the display device 114 from the user, as each character of the user input 103 is inputted by the user.

As other examples, the user input 103 may be a credit card number, a debit number, or a reference number that is relatively long and that may be displayed to the user on the display device 114, as each character of the user input 103 is inputted by the user (unlike the password example which is hidden). In either case, the computing device 102 may generate an icon 124 that is based upon a checksum function of the user input 103. The icon 124 may be displayed to the user on the display device 114. It should be appreciated that the term password also refers to a personal identification number (e.g., PIN code) or any other type of private entry that a user may utilize as a secretive password or key.

As an example, FIG. 1 shows a computing device 102 that may include a processor 104, a memory 106, a display device 114, and a user interface 112. Processor 104 may be configured to execute operations to be hereinafter described. Particularly, processor 104 may implement an icon generator function 105, which will be hereinafter described. Memory 106 may store operations, applications, programs, routines, etc., that aid in implementing these operations and functions.

Computing device 102 may also include common device features such as a display device 114, a user interface 112 (e.g., a keyboard, a keypad, touch screen input, etc.), and an interface (I/F) 108, as well as many others. As will be described, computing device 102 may be any type of computing device that can communicate through a wireless or wired interface (I/F) 108 through a network 118 to a server computer 120 or another computing device. Such computing devices may include: personal computers, desktop computers, laptop computers, mobile computers, mobile devices, personal digital assistants, wireless phones, cell phones, smart phones, tablets, ATMs, point of sale terminals (POS), or any type of computing device.

It should be appreciated that I/F 108 may include any type of interface for communication via a wired or wireless link 117, through a network 118, to a server computer 120 or another type of computing device. As examples, I/F 108 may be a wired or wireless based interface (e.g., a cable/wire modem or a wireless interface (e.g. a transceiver that includes a wireless receiver and transmitter) to receive and transmit data through a link. As examples, Wi-Fi I/Fs, cellular phone I/Fs, USB I/Fs, wired modem I/Fs, or any type of I/F structure may be utilized.

It should be appreciated that any type of wireless, wired, cellular, Wi-Fi, etc., communication method from computing device 102 through wired or wireless links 117 through a wired or wireless network 118 to a server computer 120, or another computing device, may be implemented by computing device 102. As examples, via this type of wireless or wired communication implementation, access may be enabled (e.g., through the Internet) to a server website 120 associated with banking services, on-line stores for purchases, particular websites for payments (e.g., utility companies, hospitals, phone companies, government sites, etc.), as well as through other networks to other private network sites (e.g., corporate, university, government, etc.) via VPNs, etc. It should be appreciated that these are merely examples and any type of network, links, server, website, network site, etc., may be associated with embodiments of the invention. Particular examples will be hereinafter described.

In one embodiment, computing device 102 under the control of processor 104 implementing an icon generator function 105 may receive a user input 103 (e.g. a password, credit card number, debit number, reference number, etc.). Based upon the user input 103, utilizing the icon generator function 105, computing device 102 may generate an icon 124 based upon a checksum function, which is based upon the user input 103, and may display the icon 124 to a user on the display device 114. In another embodiment, server 120 having a processor and other computing device functionality may include the icon generator 105 and may generate the icon 124 based upon a checksum function, which is based upon the user input 103 (e.g. a password, credit card number, debit number, reference number, etc.), and may cause the display of the icon 124 to a user on the display device 114. Thus, the icon generator 105 of the server computer 120 may execute operations to generate the icon 124 based upon a checksum function of received user input and may transmit the icon 124 to a computing device 102 for display.

As an example, the user input 103 may be a password that is inputted by the user through the user interface 112, which is hidden on the display from the user, as shown as password 122 on the display device 114. The computing device 102, utilizing the icon generator function 105, generates the icon 124 based upon a checksum function of the user input and the icon 124 is displayed to the user on the display device 114. If the password 122 is correctly entered, then the icon 124 is what the user expects, such that the user knows they have entered the correct password. Therefore, even though the password is hidden from the user, the user knows that the password is correct, based upon the icon 124 displayed on the display device 114.

As another example, the user input 103 may be a credit card number, a debit number, or a reference number that is relatively long and that is displayed to the user on the display device 114, as each character of the user input is inputted by the user (i.e., it is not hidden from the user). Likewise, in this case, computing device 102 utilizing the icon generator function 105 generates an icon 124 that is based upon a checksum function of the user input and the icon 124 is displayed to the user on the display device 114. In this way, once the user has completed the input of the credit card number, debit number, or reference number, the user can identify if their user input is correct based upon the icon 124 displayed on the display device 114—because the user already knows what that the valid icon 124 should look like. Accordingly, based upon the icon 124, the user knows the correct credit card number, debit number, reference number, etc. has been entered. This is very useful because credit card numbers, debit numbers, and reference numbers can often be very long and are prone to user error during input.

Further, the icon 124 may be continuously generated and displayed on the display device 114, based upon the checksum function, as each character is inputted by the user. In particular, once the user has completed their user input 103 of the password, credit card number, etc., the user can identify if their user input is correct based upon the icon 124 displayed on the display device 114. If the icon 124 matches the predefined icon for their password, credit card number, etc., the user knows that they have entered the correct code and can proceed with logging on to their computing device 102, proceeding with a banking transaction, a purchase transaction, or other functionality as will be hereinafter described in more detail.

It should be appreciated that the icon 124 is predefined such that the user knows the shape, color, pixelation, etc., of the icon, so that user knows their input is correct if the predefined correct icon 124 appears. As previously described, the icon 124 is based upon a checksum function of the user input 103 (e.g., password, credit card number, etc.) by utilizing an icon generator 105 of the computing device 102 or server 120 (that implements the checksum function) to generate the icon 124. In some embodiments, predefined passwords, reference numbers, etc., and corresponding predefined icons may be provided to users by the computing device 102 or the server 120. In some embodiments, the icons are generated and provided to users based upon existing passwords, credit card numbers, debit numbers, reference numbers, etc.

Figure 2:
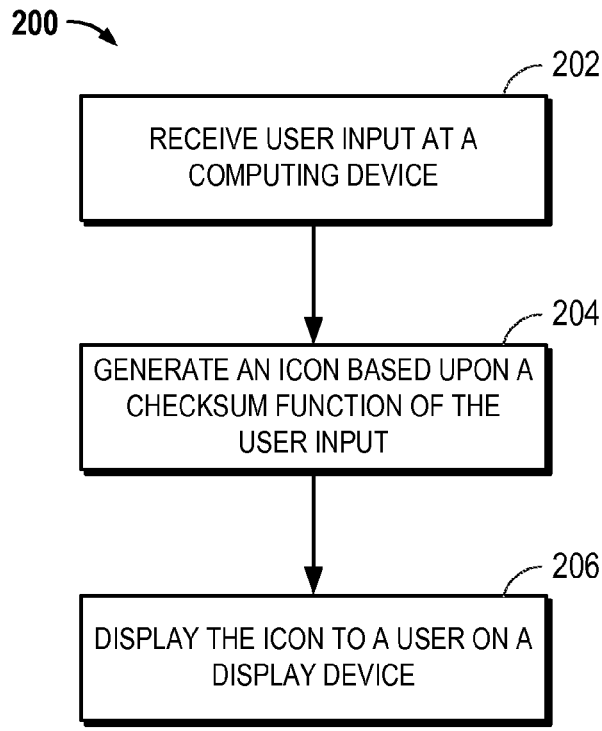
FIG. 2 is a flow diagram illustrating an example of a process to generate and display an icon.

With brief reference to FIG. 2, FIG. 2 is a flowchart illustrating a process 200 to display an icon 124 based upon user input 103. For example, in process 200, user input 103 is received at computing device 102. (Block 202). Next, process 200 generates an icon 124 based upon a checksum function of the user input 103. (Block 204). Then, process 200 displays the icon 124 to a user on the display device 114. (Block 206). In this way, if the icon 124 matches the user known predefined icon for the password number, credit card number, debit number, reference number, etc., the user knows that they have entered the correct number and can proceed with logging onto the computing device 102 and/or proceeding with their purchase transaction, banking transaction, etc.

As will be described, the icon 124 may include a particular shape, a particular color, and a particular pixelation that is based upon the checksum function of the user input 103. For example, as will be described, the icon 124 may be star-shaped, a pair of colored rectangles, or a colored triangle with colored lines through the triangle. There may be an almost infinite variety of different types of icons 124, and these are merely examples. The icons 124 are typically predefined based upon the checksum function. In one particular example, the shape, the color, and pixelation of the icon 124 may be based upon modulus division checksum functions. It should be appreciated that the computing device 102 may generate the predefined icon based upon the icon generator 105 or the icon may be generated by the icon generator 105 of the server 120 which the user is accessing via the computing device 102.

Examples will be hereinafter described.

Figure 3:
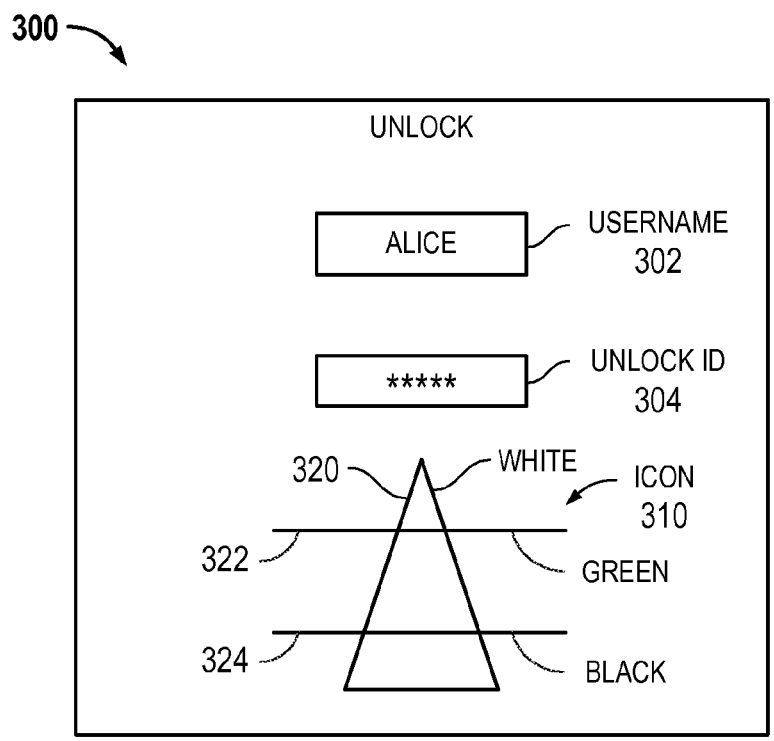
FIG. 3 is a diagram illustrating an example of an unlock process that utilizes an icon.

With reference to FIG. 3, an example of a display screen 300 to unlock a computing device 102 is illustrated. For example, a user may input their user name (e.g., ALICE) into a user name text block 302. Next, the user may enter their unlock ID into a unlock ID text box 304. The unlock ID may be hidden for security purposes. However, as the characters of the unlock ID are entered, computing device 102 generates icon 310.

For example, in this example, icon 310 may be a white colored triangle 320 with a green colored line 322 and a black colored line 324 extending through the white colored triangle 320. Therefore, icon 310 has a particular shape, color, and pixelation that is based upon a checksum function of the user input generated by the icon generator 105 of the computing device 102.

After the user has inputted their complete unlock ID, if the icon 310 matches the predefined icon for their unlock ID 304 that the user knows, then the user knows that they have entered the correct unlock ID 304 and can proceed with unlocking their computing device 102 (e.g., unlocking their personal computer or smart phone). In some embodiments, if the computing device 102 is connected through network 118 to a server 120, server 120 utilizing the icon generator 105 may generate the icon 310 for display.

Figure 4:
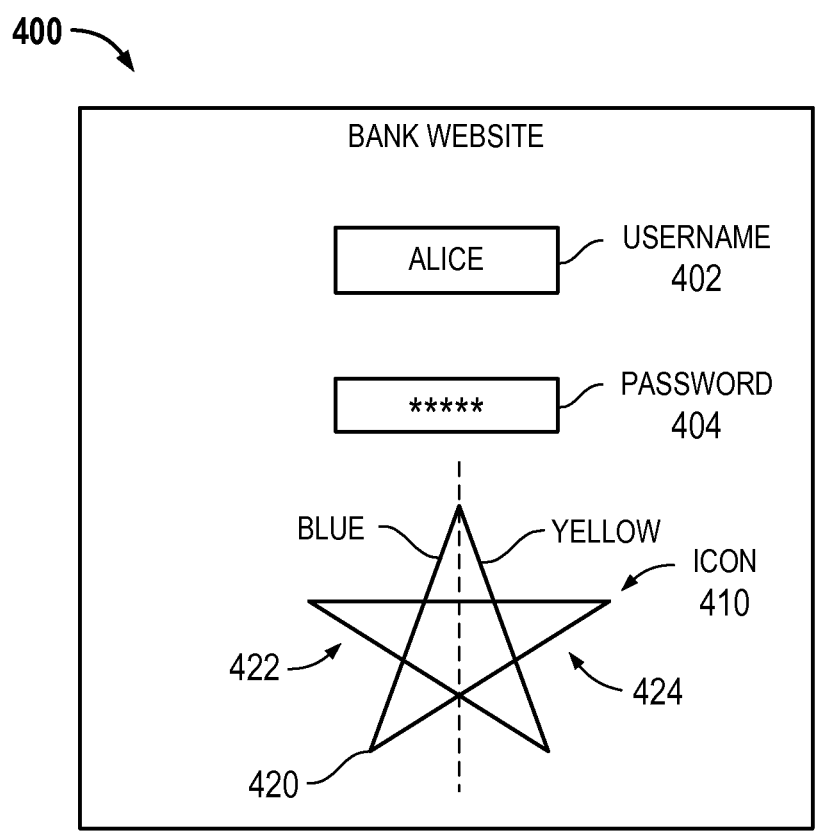
FIG. 4 is a diagram illustrating an example of bank website access process that utilizes an icon.

With reference to FIG. 4, an example of a display screen 400 to access a bank server 120 through a computing device 102 is illustrated. For example, a user may input their user name (e.g., ALICE) into a user name text block 402. Next, the user may enter their password into a password text box 404. The password may be hidden for security purposes. However, as the characters of the password are entered, computing device 102 generates icon 410.

For example, in this example, icon 410 may be a star 420 with the right-half 424 being yellow and the left-half 422 being blue. Therefore, icon 410 has a particular shape, color, and pixelation that is based upon a checksum function of the user input generated by the icon generator 105 of the computing device 102.

After the user has inputted their complete password, if the icon 410 matches the predefined icon for their password that the user knows, then the user knows that they have entered the correct password and can proceed with their banking functions (e.g., looking at their accounts, proceeding with money transfers, paying bills, etc.). In some embodiments, banking server 120 may utilize the icon generator 105 to generate the icon 410 for display.

As a similar example, with reference to FIG. 4, the computing device 102 may be an ATM machine in which the user has inputted a debit card or a credit card and the ATM machine is connected to the bank server 120 to access their account and possibly request cash or banking transactions. As previously described, a user may input their user name (e.g., ALICE) into a user name text block 402. Next, the user may enter their password into a password text box 404. The password may be hidden for security purposes. However, as the characters of the password are entered, ATM 102 generates icon 410. In this example, icon 410 may be a star 420 with the right-half 424 being yellow and the left-half 422 being blue.

After the user has inputted their complete password, if the icon 410 matches the predefined icon for their password that the user knows, then the user knows that they have entered the correct password and can proceed with their banking functions (e.g., looking at their accounts, requesting cash, performing banking transactions, etc.). Either the ATM 102 or the banking server 120 may utilize the icon generator 105 to generate the icon 410 for display.

As yet another similar example, with reference to FIG. 4, the computing device 102 may be a point of sale (POS) terminal in which the user has inputted a debit card or a credit card and the POS terminal is connected to a credit card server or bank server 120 to access their account and authorize the transaction. As previously described, a user may input their user name (e.g., ALICE) into a user name text block 402. Next, the user may enter their password into a password text box 404. The password may be hidden for security purposes. However, as the characters of the password are entered, POS terminal 102 generates icon 410. In this example, icon 410 may be a star 420 with the right-half 424 being yellow and the left-half 422 being blue.

After the user has inputted their complete password, if the icon 410 matches the predefined icon for their password that the user knows, then the user knows that they have entered the correct password and can proceed with their purchase transaction (e.g., the purchase transaction has been authorized). Either the POS terminal 102 or the bank/credit card server 120 may utilize the icon generator 105 to generate the icon 410 for display.

Figure 5:
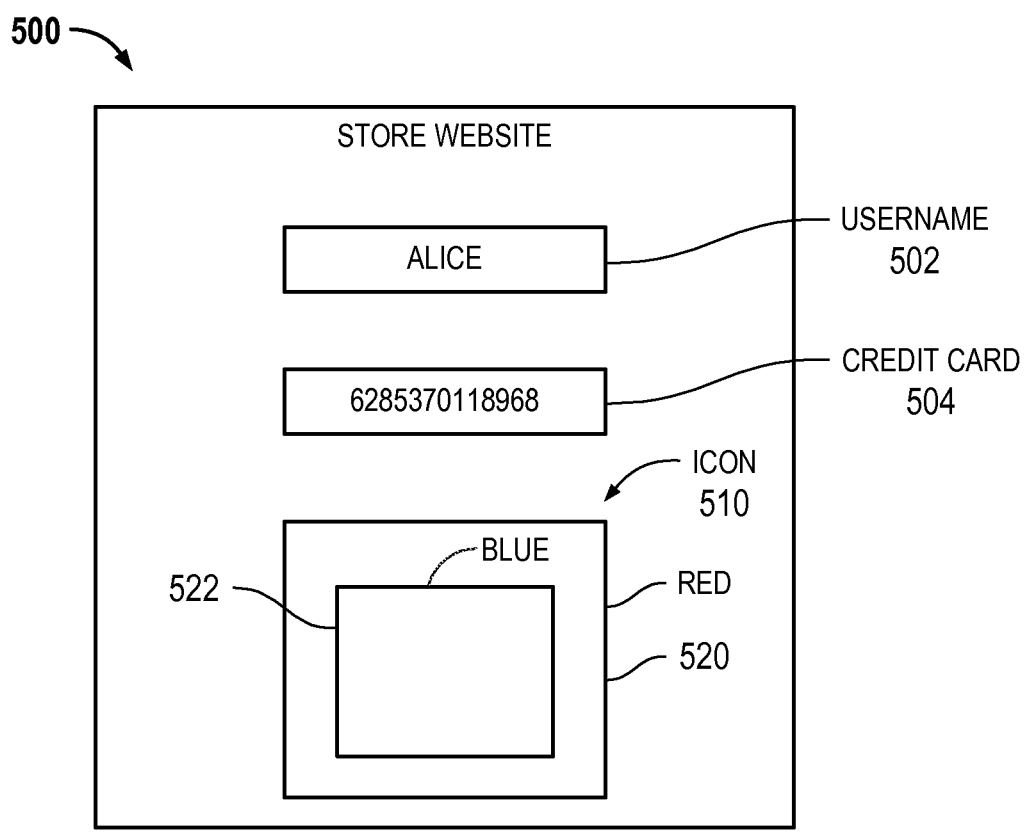
FIG. 5 is a diagram illustrating an example of on-line store credit card entry process that utilizes an icon.

With reference to FIG. 5, an example of a display screen 500 to access an on-line store website server 120 through a computing device 102 is illustrated. For example, a user may input their user name (e.g., ALICE) into a user name text block 502. Further, the user may authenticate themselves via a password. For example, the password may be entered with an icon to aid the user, as previously described with reference to FIG. 4. Moreover, the user may enter a long credit card number into a credit card box 504 that is not hidden. As the long credit card number is inputted, the icon 510 is generated.

In this example, icon 510 may be a red rectangle 520 with a smaller blue rectangle 522 generated within the red rectangle. Thus, icon 510 has a particular shape, color, and pixelation that is based upon a checksum function of the user input generated by the icon generator 105 of the computing device 102.

After the user has inputted their complete credit card number, if the icon 510 matches the predefined icon for their credit card that the user knows, then the user knows that they have entered the correct credit card number and can proceed with their purchase transaction. In some embodiments, the store website server 120 may utilize the icon generator 105 to generate the icon 510 for display. This is useful because long reference numbers, such as credit card numbers or debit card numbers, although they are displayed to the user upon entry, due to their length are prone to entry error and the icon 510 generated identifies to the user that they have inputted the correct credit card number.

Therefore, embodiments of the invention relate to using a checksum function in an icon generator 105 to generate an icon. The icon may be composed of a particular shape, color, pixelation, which is determined by the checksum function. Accordingly, as a previously described, each input such as: an unlock ID (FIG. 3), a password (FIG. 4), a credit card number (FIG. 5), etc.; produces a distinct different looking icon that is predefined and that is easily identifiable by a user.

It should be appreciated that because humans are better at pattern and color recognition than in determining subtle differences between the digits of long number entries or in subtle difference in entering hidden passwords, if the number or letter has been entered incorrectly, utilizing embodiments of the invention related to the icon generator, the resulting icon will appear to be wrong to the user, clearly identifying that the numbers/letters have been entered incorrectly such that the user can reenter the characters.

There are a wide variety of different types of computer systems in which the icon generator to generate icons may be utilized, above and beyond those previously described with reference to FIGS. 3-5.

As an additional example, an icon may be printed next to a reference number (e.g., an account number or a billing number) on a bill that is received in a physical letter or an email, which is received by a user. As an example, when the user attempts to pay the bill on-line via a server website 120 (e.g., to a power company through their server website or through a bank website) utilizing the user's computing device 102, the user may enter the account number or the billing number incorrectly, in which case the resulting on-line generated icon will not match the one on the bill. However, if the account number or billing number is entered correctly, then the generated icon will match the icon on the bill. An example of this is similar to the credit card number being entered in FIG. 5 and the icon 510 being generated on the display screen 500 of the website. However, in this instance, instead of an online store website, the receiver of payment may be another entity, such as a power company.

It should be appreciated that there are a wide variety of different types of computer systems in which the code generator to generate icons may be utilized to authenticate passwords, credit card numbers, debit numbers, reference numbers, unlock IDs, other types of IDs, etc. Further, it should be appreciated that a wide variety of different checksum schemes may be used to generate an almost infinite variety of different icons for users.

As one example, the shape, color, and pixelation of the icon may be based upon a modulus division checksum function (e.g., mod 5, mod 7, mod 12, etc.). As an example, this scheme may be designed so that if a small change is made to a number (e.g., entering a number 1 instead of a number 0) the shape may not change, but the colors will change drastically. However, if a bigger change is made to the number (e.g., swapping two digits), then the color may or may not change drastically, but the shape may change significantly.

Additionally, it should be appreciated that many other schemes may be used to generate the icons (CRC, parity checks, hashing functions, etc.), and other types of visual distinctions may be made (color charts, symmetry, polygonal shapes, etc.). These may be in addition or in lieu of the previously described checksum methodology.

Also, it should be appreciated that for certain types of non-numeric character entries (e.g., letters, glyphs, specialized characters, etc.) that the characters may be converted to their ASCII code equivalent. Further, these digits may be concatenated to produce a number that can be subjected to the same arithmetic checksum algorithms for generating the visual comparison icon.

Therefore, by utilizing embodiments of the invention, whether a user is entering hidden passwords or long digit numbers for payment (e.g. credit card numbers, account numbers, reference numbers, etc.), if the icon matches the predefined icon, the user knows that they have entered the correct code and can proceed with unlocking their computer device, proceeding with their banking transaction, proceeding with their payment or purchase, etc. Because human beings are better at pattern and color recognition than determining the subtle differences between numbers and letters, the use of an icon, as previously described, provides a very useful way for the user to determine that they have entered the correct code.

It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). Additionally, newer standards include 4G and Advanced LTE.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale (POS) device, an entertainment device, a set-top box, an ATM, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of displaying an icon based upon user input comprising:
   receiving user input at a computing device;
   generating the icon based upon the user input, wherein a shape of the icon is based upon a first modulus division checksum function of the user input and a color of the icon is based upon a second modulus division checksum function of the user input, such that a single icon is generated; and
   displaying the single icon to a user on a display device, wherein the single icon is continuously generated and displayed on the display device based upon the checksum functions as each character of the user input is inputted by the user.

2. The method of claim 1, wherein the user input is a password that is hidden from the user on the display device as each character of the password is inputted by the user.

3. The method of claim 1, wherein the user input is at least one of a credit card number, a debit number, or a reference number that is displayed to the user on the display device as each character of the user input is inputted by the user.

4. The method of claim 1, wherein, once the user input is complete, the user can identify if the user input is correct based upon the single icon displayed on the display device.

5. The method of claim 1, wherein the single icon is predefined for the user based upon the checksum functions.

6. A computing device comprising:
   a user interface to receive user input;
   a display device; and
   a processor coupled to the user interface, the processor to execute operations including:
      generating an icon based upon the user input, wherein a shape of the icon is based upon a first modulus division checksum function of the user input and a color of the icon is based upon a second modulus division checksum function of the user input, such that a single icon is generated; and
      displaying the single icon to a user on the display device, wherein the single icon is continuously generated and displayed on the display device based upon the checksum functions as each character of the user input is inputted by the user.

7. The computing device of claim 6, wherein the user input is a password that is hidden from the user on the display device as each character of the password is inputted by the user.

8. The computing device of claim 6, wherein the user input is at least one of a credit card number, a debit number, or a reference number that is displayed to the user on the display device as each character of the user input is inputted by the user.

9. The computing device of claim 6, wherein, once the user input is complete, the user can identify if the user input is correct based upon the single icon displayed on the display device.

10. The computing device of claim 6, wherein the single icon is predefined for the user based upon the checksum functions.

11. A computing device comprising:
means for receiving user input;
means for generating an icon based upon the user input, wherein a shape of the icon is based upon a first modulus division checksum function of the user input and a color of the icon is based upon a second modulus division checksum function of the user input, such that a single icon is generated; and
means for displaying the single icon to a user, wherein the single icon is continuously generated and displayed on the display device based upon the checksum functions as each character of the user input is inputted by the user.

12. The computing device of claim 11, wherein the user input is a password that is hidden from the user as each character of the password is inputted by the user.

13. The computing device of claim 11, wherein the user input is at least one of a credit card number, a debit number, or a reference number that is displayed to the user as each character of the user input is inputted by the user.

14. The computing device of claim 11, wherein, once the user input is complete, the user can identify if the user input is correct based upon the single icon displayed.

15. The computing device of claim 11, wherein the single icon is predefined for the user based upon the checksum functions.

16. A computer program product executed at a computing device comprising:
a non-transitory computer-readable medium comprising code for:
receiving user input at a computing device;
generating an icon based upon the user input, wherein a shape of the icon is based upon a first modulus division checksum function of the user input and a color of the icon is based upon a second modulus division checksum function of the user input, such that a single icon is generated; and
displaying the single icon to a user on a display device, wherein the single icon is continuously generated and displayed on the display device based upon the checksum functions as each character of the user input is inputted by the user.

17. The computer program product of claim 16, wherein the user input is a password that is hidden from the user as each character of the password is inputted by the user.

18. The computer program product of claim 16, wherein the user input is at least one of a credit card number, a debit number, or a reference number that is displayed to the user as each character of the user input is inputted by the user.

19. The computer program product of claim 16, wherein, once the user input is complete, the user can identify if the user input is correct based upon the single icon displayed.

20. The computer program product of claim 16, wherein the single icon is predefined for the user based upon the checksum functions.

21. A server computer comprising:
an icon generator to execute operations including:
generating an icon based upon received user input, wherein a shape of the icon is based upon a first modulus division checksum function of the user input and a color of the icon is based upon a second modulus division checksum function of the user input, such that a single icon is generated; and
transmitting the single icon to a computing device for display, wherein the single icon is continuously generated and displayed on a display device of the computing device based upon the checksum functions as each character of the user input is inputted by a user.

22. The server computer of claim 21, wherein the user input is a password that is hidden from the user on the display device of the computing device as each character of the password is inputted by the user.

23. The server computer of claim 21, wherein the user input is at least one of a credit card number, a debit number, or a reference number that is displayed to the user on the display device of the computing device as each character of the user input is inputted by the user.

24. The server computer of claim 21, wherein, once the user input is complete, the user can identify if the user input is correct based upon the single icon displayed on the display device.

25. The server computer of claim 21, wherein the single icon is predefined for the user based upon the checksum functions.

26. A computer program product executed at a server computer comprising:
a non-transitory computer-readable medium comprising code for:
generating an icon based upon received user input, wherein a shape of the icon is based upon a first modulus division checksum function of the user input and a color of the icon is based upon a second modulus division checksum function of the user input, such that a single icon is generated; and
transmitting the single icon to a computing device for display, wherein the single icon is continuously generated and displayed on a display device of the computing device based upon the checksum functions as each character of the user input is inputted by a user.

27. The computer program product of claim 26, wherein the user input is a password that is hidden from the user on the display device of the computing device as each character of the password is inputted by the user.

28. The computer program product of claim 26, wherein the user input is at least one of a credit card number, a debit number, or a reference number that is displayed to the user on the display device of the computing device as each character of the user input is inputted by the user.

29. The computer program product of claim 26, wherein, once the user input is complete, the user can identify if the user input is correct based upon the single icon displayed on the display device.

30. The computer program product of claim 26, wherein the single icon is predefined for the user based upon the checksum functions.

* * * * *